United States Patent [19]

Cook

[11] Patent Number: 5,410,916
[45] Date of Patent: May 2, 1995

[54] FLOWTHROUGH PRESSURE SENSOR

[75] Inventor: James D. Cook, Freeport, Ill.

[73] Assignee: Honeywell Inc., Minneapolis, Minn.

[21] Appl. No.: 265,472

[22] Filed: Jun. 24, 1994

[51] Int. Cl.[6] .............................................. G01L 9/04
[52] U.S. Cl. ........................................ 73/706; 73/756; 73/431; 128/748
[58] Field of Search ......................... 73/706, 756, 431; 128/748

[56] References Cited

U.S. PATENT DOCUMENTS

| 4,535,635 | 8/1985 | Claren et al. | 73/756 |
| 4,656,454 | 4/1987 | Rosenberger | 338/2 |
| 4,879,903 | 11/1989 | Ramsey et al. | 73/431 |
| 5,042,495 | 8/1991 | Spotts et al. | |
| 5,067,491 | 11/1991 | Taylor, II et al. | 128/748 |
| 5,146,782 | 9/1992 | Rasmussen | 73/273 |
| 5,184,107 | 2/1993 | Maurer | 338/42 |
| 5,257,547 | 11/1993 | Boyer | 73/756 |

OTHER PUBLICATIONS

2 Engineering Drawings Relating to Flow-Through Sensors.

Primary Examiner—Richard E. Chilcot, Jr.
Assistant Examiner—Jewel V. Artis
Attorney, Agent, or Firm—William D. Lanyi

[57] ABSTRACT

A flowthrough pressure sensor is provided which avoids the creation of crevices and creases that could provide difficult to cleanse regions. The pressure sensor is particularly adapted for use in applications that require cleansing to avoid the build up of bacterial-laden material. The flowthrough pressure sensor is particularly adapted for use in the measurement of bodily fluids. A first conduit is connected in fluid communication with the second conduit which, in turn, is associated with a pressure sensitive element and two compressible seals. A housing member is provided with an opening into which the compressible seals in the pressure sensitive element are disposed. A latching mechanism is provided to force the housing against a boss portion of the first conduit so that the seals and the pressure sensitive element are compressed therebetween.

17 Claims, 3 Drawing Sheets

FLOWTHROUGH PRESSURE SENSOR

BACKGROUND OF THE INVENTION

1. Field of the Invention

The present invention relates generally to pressure sensors and, more particularly, to a flowthrough pressure sensor which permits the use of materials approved by the Federal Food and Drug Administration in applications where the pressure of body fluids are to be measured.

2. Description of the Prior Art

Various types of pressure sensors are known to those skilled in the art. For example, U.S. Pat. No. 5,042,495, which issued to Spotts et al on Aug. 27, 1991, discloses a pressure sensor which comprises a first housing piece defining a lumen therethrough and an opening to the lumen to provide communication between it and a sensing element. The housing piece has a first surface surrounding its opening. A second housing piece is shaped for mating with the first housing piece and provides a region for containing a sensing element in position to communicate with the lumen via its opening. The second housing piece has a second surface that surrounds the region. It faces and conforms to the shape of the first surface. Also disclosed are insulation displacement blades to provide electrical connection between a sensing element and a wire and a compressed elastomeric displacement ceiling ring filled with gel and providing a communication path between the opening and the sensing element.

U.S. patent application Ser. No. 07/962,641 (M10-14882) was filed on Oct. 16, 1992 by Maurer and assigned to the assignee of the present application. It describes a pressure transducer which has a housing member that attaches to a rigid and generally planar member, such as a ceramic circuit board. The legs of the housing member can pass through holes in the circuit board or, alternatively, attach to the edges of the circuit board. The legs of the housing are provided with bails which have steps that are shaped to cease the circuit board after the legs are flexed to permit insertion of the board between them. The housing is provided with an opening that is shaped to receive a media seal, a pressure sensor die and a conductive seal between a surface of the opening and a surface of the ceramic circuit board. When the circuit board is attached to the housing, the seals and the pressure sensor die are compressed therebetween to provide good fluid sealing association between the components and to also provide electrical communication between components on the pressure sensor die and components on the circuit board. An alternative embodiment of the device comprises two housing members that are attached to opposite sides of the same circuit board so that a differential pressure can be measured.

U.S. Pat. No. 4,656,454, which issued to Rosenberger on Apr. 7, 1987, describes a low cost piezoresistive pressure transducer that utilizes premolded elastomeric seals and is adapted for automatic assembly. It also describes a method of producing the transducer. The piezoresistive stress sensitive element is in the form of a diaphragm of semiconductor material having a thickened rim. The element is held at its rim between a pair of premolded elastomeric seals in a thermoplastic housing. Electrical connections with external circuitry are made with strain relief jumpers which connect conductive regions on the element outside the seals to conductors which pass through the housing wall.

U.S. Pat. No. 5,184,107, which issued to Maurer on Feb. 2, 1993, discloses a low cost piezoresistive pressure transducer which utilizes premolded elastomeric seals in which at least one seal is electrically conductive. A piezoresistive stress sensitive element in the form of a diaphragm of semiconductor material having a thickened rim is held at its rim between a pair of premolded elastomeric seals in a two-piece housing. Electrical connections with external circuitry are made by conductive paths through one of the elastomeric seals which makes contact with electrical leads which pass through the housing wall.

U.S. Pat. No. 5,257,547, which issued to Boyer on Nov. 2, 1993, discloses an amplified pressure transducer which incorporates numerous stress reducing characteristics. A pressure sensor is mounted to a ceramic plate with a buffer plate therebetween in order to isolate the pressure sensor from stresses that could be transmitted through the ceramic plate. The ceramic plate is necessary for the purpose of supporting a plurality of electronic components which comprise an amplification and compensation circuit. The ceramic plate is separated from all parts of its housing accept a minimal central surface on a support boss which provides the support for the pressure sensitive device.

When flowthrough pressure sensitive devices are used to measure the pressure of body fluids, such as during kidney dialysis procedures, the pressure sensor must exhibit certain required characteristics. For example, the Federal Food and Drug Administration requires that the materials used in a pressure sensor of this type be certified as being acceptable for this type of use. In addition, if the device is intended for repeated uses the application of a pressure sensor in this type of procedure requires that the pressure sensor be designed in such a way that small crevices and spaces be avoided. By designing the pressure sensor in this manner, it can be reused following a thorough cleaning by flushing specified fluids through the system. If the pressure sensor has crevices or small spaces within its structure, the cleansing fluid may not be able to properly remove possibly hazardous bacteria from the device following its use.

It would therefore be significantly beneficial if a flowthrough pressure transducer could be developed in which the structure avoids the presence of crevices and small spaces where bacteria-laden material can accumulate and which uses materials that are approved by the Federal Food and Drug Administration.

SUMMARY OF THE INVENTION

The present invention provides a pressure sensor that comprises a first conduit that has a first central axis. This first conduit is typically a plastic tubular structure. A boss portion is formed on the first conduit and the boss portion is provided with a first planar surface formed thereon. The boss portion is generally formed on an outside surface of the plastic tube.

A second conduit is formed through the boss portion and through the first planar surface. The second conduit is disposed in fluid communication with the first conduit. A housing having an opening formed therein is also provided and the opening has a second planar surface in its bottom portion. A plurality of electrically conductive leads extends through a portion of the housing and portions of the leads are exposed within the opening formed in the housing. A pressure sensitive element is disposed within the opening of the housing and a first compressible seal is disposed between the second planar surface within the opening and the pressure sensitive element. The first compressible seal has a central opening extending through it. The first compressible seal is selectively conductive through its thickness to dispose portions of the leads in electrical communication with conductive portions of the pressure sensitive element.

A second compressible seal is disposed in contact with the pressure sensitive element. The second compressible seal is provided with a central opening that extends through its thickness. The pressure sensitive element is disposed between the first and second compressible seals. The second compressible seal is disposed between the pressure sensitive element and the first planar surface.

The present invention also provides a means for forcing the housing in a direction toward the boss portion and for compressing the first compressible seal, the second compressible seal and the pressure sensing element between the first and second planar surfaces.

The structure described above places the first conduit in fluid communication with the pressure sensing element through the second conduit and the opening of the second compressible seal. A third opening is provided, in a particularly preferred embodiment of the present invention, through the housing from the central opening of the first compressible seal to a region external to the housing. The combined length of the fluid path extending from the first conduit to the pressure sensing element is less than twice the magnitude of the diameter of the second conduit. This relative size of the fluid path and the diameter of the second conduit facilitates the cleansing operation described above. If a longer or thinner fluid path is used, the cleansing fluid might not be able to remove the possibly bacteria-laden material from the region proximate the second conduit and the pressure sensitive element.

In a particularly preferred embodiment of the present invention, the pressure sensitive element comprises a deformable silicon diaphragm that has a plurality of piezoresistive elements disposed thereon. In addition, the forcing means comprises a pair of latches in which each of the pair latches comprises a protrusion on the housing and an associated extension member attached to the first conduit. The extension member has an opening shaped to receive the protrusion therein. The first compressible seal and the second compressible seal are made of an elastomeric material in a preferred embodiment of the present invention. In addition, the first conduit comprises first and second ends which are formed into cylindrical shapes that have a diameter that is larger than the outside diameter of the first conduit. In one application of the present invention, an outer cover structure is disposed around the housing and around the boss portion. The first conduit extends from the outer cover structure in opposite directions and a conductive cable extends through a wall of the outer cover structure to provide electrical communication between the leads of the housing and external components.

As will be described in greater detail below, the present invention provides a flowthrough pressure sensor that is significantly advantageous in several ways. The materials used in the pressure sensor of the present invention are approved by the Federal Food and Drug Administration for use in kidney dialysis systems. This is important in products which contact the dialysis fluids and must be approved as being bio-compatible. The ports and housing material is Lexan 144 polycarbonate. The media seal can be Ethylene Propylene Diene Monomer, or EPDM. It can also be silicone or fluorosilicone which are all approved by the Federal Food and Drug Administration. The silicon pressure sensor used in a preferred embodiment of the present invention is coated with parylene "C" material. All of these materials meet the necessary bio-compatability requirements.

The present invention also provides a connector which avoids the creation of small crevices or fissures between the ends of the plastic tubes of the first conduit and the flexible tubing that would normally be connected to them. By using a cylindrical shaped end feature, the crevices normally associated with barbed end connectors is avoided. A splash proof connector is used to provide electrical communication between the leads which extend from the housing and an external component.

Most importantly, dead space dimensions are carefully controlled in the present invention in order to reduce the possibility of fluid entrapment and subsequent bacterial formation. The dead space, which is defined as the distance between the flow channel and the sensing element, is minimized so that the length of the dead space is less than two times the diameter of the dead space.

In order to isolate the fluids flowing through the sensor from the electrical leads extending from the housing, a coating of parylene "C" is provided on the back side of the pressure sensitive element. This coating process can be performed when the pressure sensitive element is attached to other similar elements as part of a silicon wafer. In addition, this process permits a vacuum deposition process. As a result, the coating can be very uniform and consistent. The thickness of the coating of parylene "C" is approximately five microns so that it does not affect the operation or sensitivity of the pressure sensitive element.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
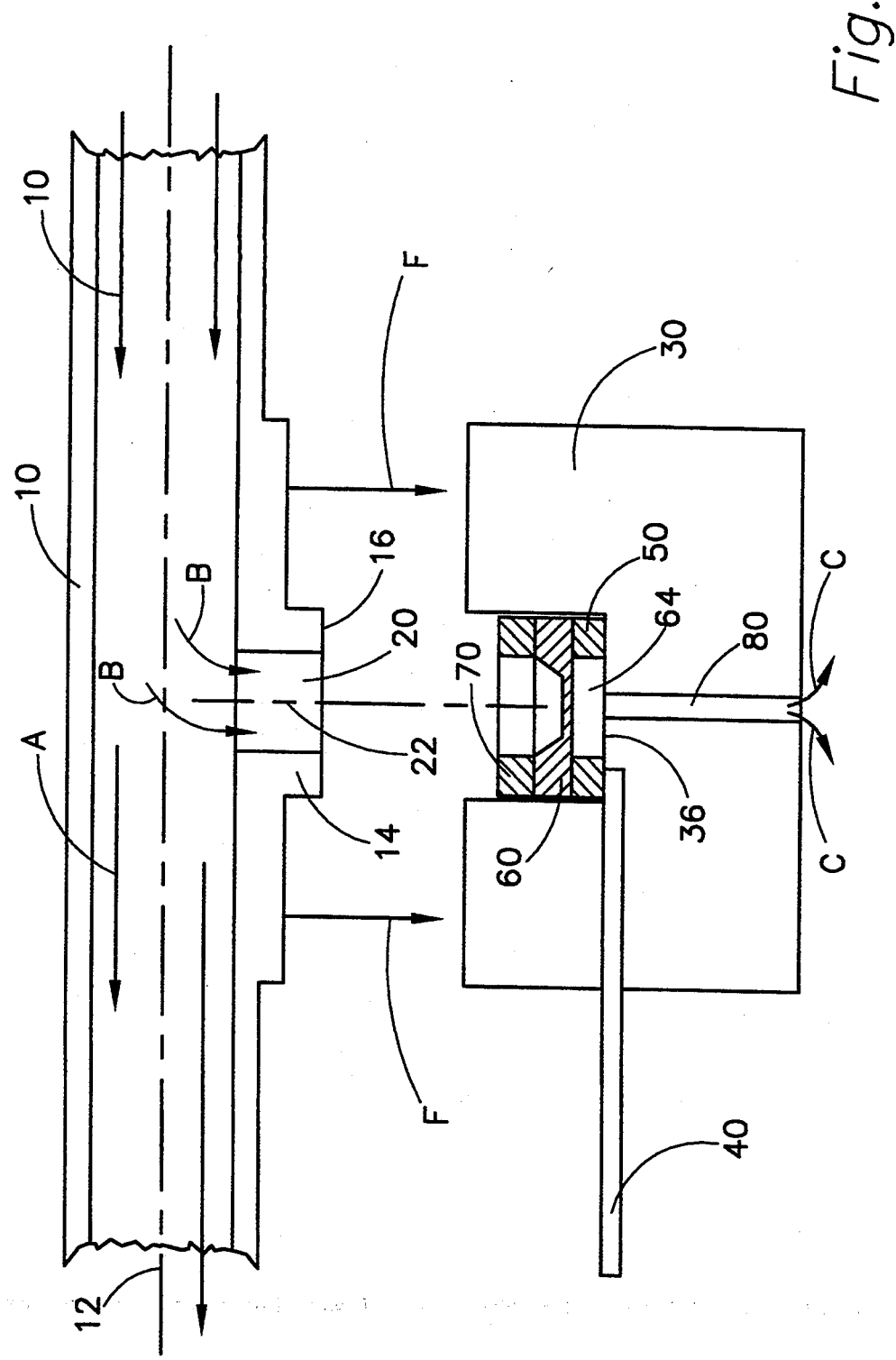
FIG. 1 is a schematic representation of a side view of the present invention.

Throughout the Description of the Preferred Embodiment, like components will be identified by like reference numerals. FIG. 1 is a schematic illustration of the present invention. A first conduit 10 is provided so that a fluid can flow through it as indicated by arrows A. In a typical application of the present invention, this fluid would be body fluid as in a dialysis processes. The first conduit 10 has a central axis 12 extending in the direction along which the fluid passes.

A boss portion 14 is formed as an attachment of the first conduit 10. The boss portion 14 is provided with a planar surface 16. A second conduit 20 is formed through the boss portion 14 and is in fluid communication with the first conduit 10. In other words, fluids flowing in the direction represented by arrows A can flow into the second conduit as represented by arrows B. The second conduit 20 has a second central axis 22 that extends in a direction along which the pressure of the fluid can be transmitted.

With continued reference to FIG. 1, a housing 30 is provided with an opening 32 formed therein. The opening has a bottom planar surface 36. As shown in FIG. 1, an electrical lead 40 extends from a position external to the housing 30 and through a portion of the housing 30 toward the bottom planar surface 36 in the opening 32. Although only one electrical lead 40 is shown in FIG. 1, it should be understood that a plurality of electrical conductors are similarly positioned to provide electrical and signal communication between an external part of the housing and preselected locations in the bottom planar surface 36 of the opening 32.

A first compressible seal 50 is disposed in contact with the second planar surface 36. The first compressible seal 50 has a central opening as shown in FIG. 1 and is further provided with means for conducting an electrical current between its upper and lower surfaces.

A pressure sensitive element 60 is disposed in the opening 32 on top of the first compressible seal 50. As can be seen in FIG. 1, the pressure sensitive element 60 is provided with a diaphragm portion 64 that can be deformed in response to differences in pressure between its upper and lower surfaces. In a manner well known to those skilled in the art, the diaphragm portion 64 is provided with piezoresistors which can sense the magnitude of deflection of the diaphragm portion and provide a signal that is representative of the pressure differential on both sides of the diaphragm portion 64.

The selective conductivity of the first compressible seal 50 provides electrical communication between components on the lower surface of the pressure sensitive element 60 and preselected ones of the electrical leads 40. Seals of this type are well known to those skilled in the art, are described in U.S. Pat. No. 5,184,107 and available in commercial quantities.

A second compressible seal 70 is disposed on the upper surface of the pressure sensitive element 60. The second compressible seal 70 also comprises a central opening which provides fluid communication between the second conduit 20 and the space proximate the diaphragm portion 64 of the pressure sensitive element 60. When the first planar surface 16 of the boss portion 14 is disposed in contact with the upper surface of the second compressible seal 70, a downward force can compress the first compressible seal, the second compressible seal and the pressure sensitive element between the first planar surface 16 and the second planar surface 36. This force is imposed in the direction represented by arrows F. When the force F is provided, the pressure sensitive element 60 is compressed between the first and second compressible seals, 50 and 70, and a pressure transmitting channel is formed by the second conduit 20 and the opening of the second compressible seal 70 between the first conduit 10 and the diaphragm portion 64 of the pressure sensitive element 60. It should be understood that FIG. 1 is schematic in nature and intended to show the basic theory of operation of the present invention. It should be noted that no bonding material is required to maintain the fluid integrity of the system. This is important in applications of this type because many bonding materials are not likely to be approved by the Federal Food and Drug Administration for use with bodily fluids in processes of this type. In addition, the diameter of the second conduit 20 and of the opening in the second compressible seal 70 can be controlled and maintained relatively large compared to the length of the fluid passage defined by those openings. In other words, the vertical length of the second conduit 20 in FIG. 1 need not be significant to perform its intended function. Because of this structure, the vertical length of the passage defined by the second conduit 20 and the opening in the second compressible seal 70 need not be significant in relation to the diameter of the second conduit 20 and the opening of the second compressible seal 70. In other words, the length of the fluid passage can be maintained at a dimension that is less than twice its width. This significantly facilitates the ability to clean the device after its use.

With continued reference to FIG. 1, a third conduit 80 is provided through the housing 30 to permit air to move into or away from the central opening in the first compressible seal 50. This facilitates the measurement of differential pressure on the opposite sides of the diaphragm portion 64. The passage of air through the third conduit 80 is represented by arrows C. Although not particularly illustrated in FIG. 1 because of its size, it should be understood that the upper surface of the diaphragm portion 64 and the other upper surfaces of the pressure sensitive element 60 are coated with a thin layer of parylene "C" as described above. The advantage of this coating of parylene "C" is that it significantly increases the voltage potential that the pressure sensitive element 60 can withstand through its thickness. In other words, the electrical voltage potential in the region of the electrical leads 40 and the lower surface of the pressure sensitive element 60 could otherwise induce a break down through the thickness of the pressure sensitive element and place the electrical leads 40 in electrical communication with the bodily fluid flowing through the first and second conduits. Since the bodily fluid is likely to be conductive, this could provide a hazardous condition. However, the provision of a layer of parylene "C" avoids this condition by increasing the break down voltage characteristic of the pressure sensing element 60.

Figure 2:
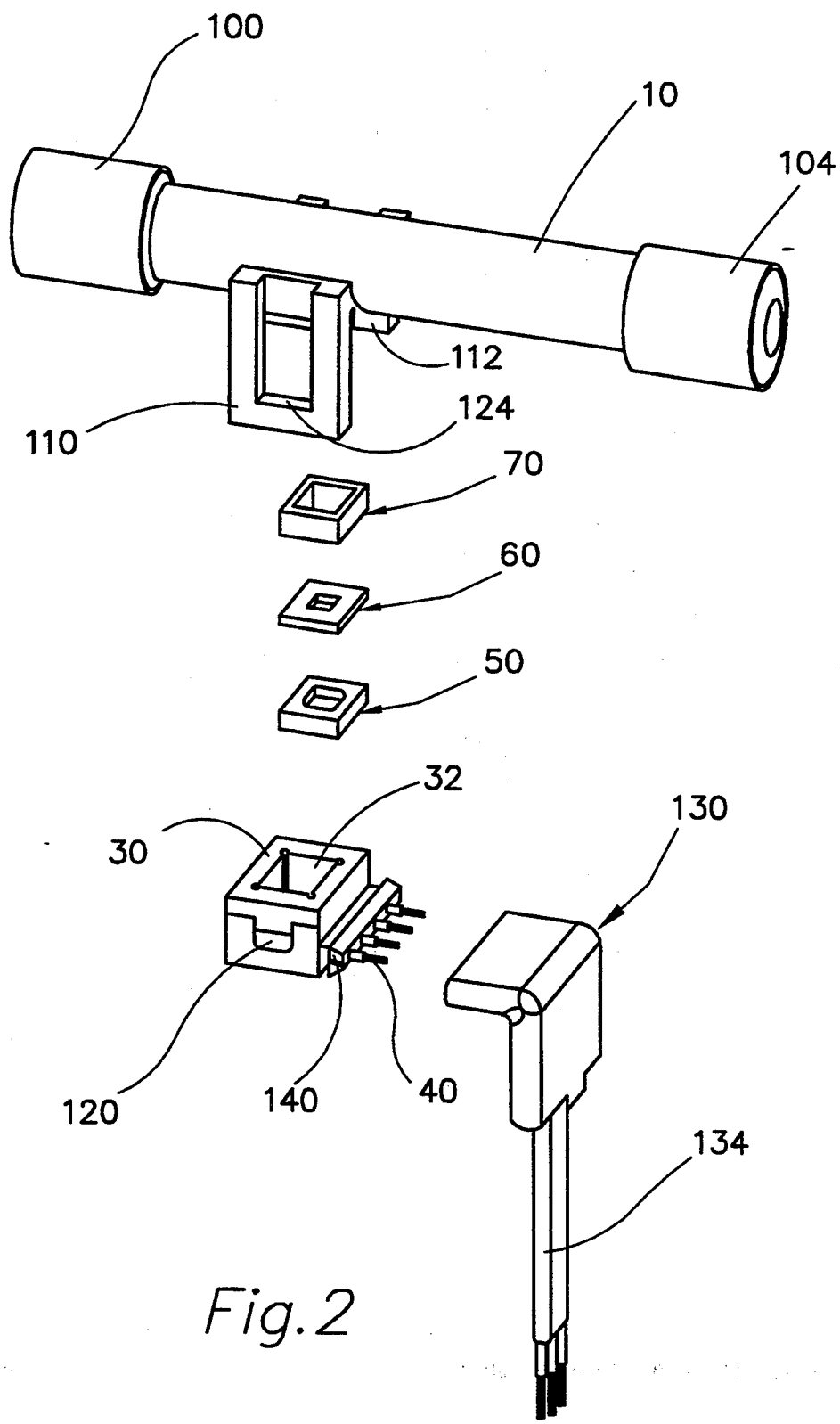
FIG. 2 is an exploded perspective illustration of the present invention.

FIG. 2 illustrates the present invention in a perspective view. The first conduit 10 comprises a generally tubular member. At the ends of the tubular member, the first conduit 10 is shaped to define generally cylindrical end portions, 100 and 104. As described above, the end portions are shaped in a cylindrical configuration to avoid the creation of crevices or gaps between the outer cylindrical surface and a flexible plastic tube that is generally used to connect the flowthrough pressure sensor to external equipment, such as a dialysis machine. Although the boss portion 14 is not shown in FIG. 2 because of its perspective view, it should be understood that it is disposed in as an attached extension of the first conduit 10 below the plastic tube and between the extensions, 110 and 112. The housing 30 is illustrated in FIG. 2 with its opening 32 formed therein. The first compressible seal 50 is inserted into the opening 32 and disposed on the second planar surface 36 at its bottom. Then, the pressure sensitive element 60 is disposed onto the first compressible seal 50. The second compressible seal 70 is then inserted into the opening 32 so that the pressure sensitive element 60 is between the two compressible seals.

As shown in FIG. 2, the housing 30 comprises protrusions 120. Although only one protrusion 120 is shown in FIG. 2, it should be understood that another protrusion is disposed on the opposite side of the housing 30. The protrusions 120 are shaped to be received in openings 124 formed in each of the extensions, 110 and 112. The dimensions of the extensions, the openings 124 and the protrusions 120 are selected to rigidly attach the housing 30 to the first conduit 10 in such as way that a compressive force is exerted between the first and second planar surfaces. This compressive force compresses the first compressible seal 50, the second compressible seal 70 and the pressure sensitive element 60 between the planar surfaces and maintains a seal which defines a fluid passage between the diaphragm portion 64 of the pressure sensitive element 60 and the first conduit 10.

With continued reference to FIG. 2, it can be seen that four conductive leads 40 extend from the housing 30. These four conductive leads 40 are shaped to be received in sockets formed in a connector 130 which permits the electrical leads 40 to be connected in electrical communication with a cable 134. This permits the present invention to be connected in signal communication with an external component, such as the dialysis machine.

The leads 40 extend from the housing 30 with a plastic extension 40 being disposed around the base portions of the leads closest to the housing 30. The extension 140 is provided with a lip that cooperates with the insulative cover surrounding the connector 130. This relationship provides a splash guard to prevent fluids from collecting in the region between the leads 40 and the connector 130.

Figure 3:
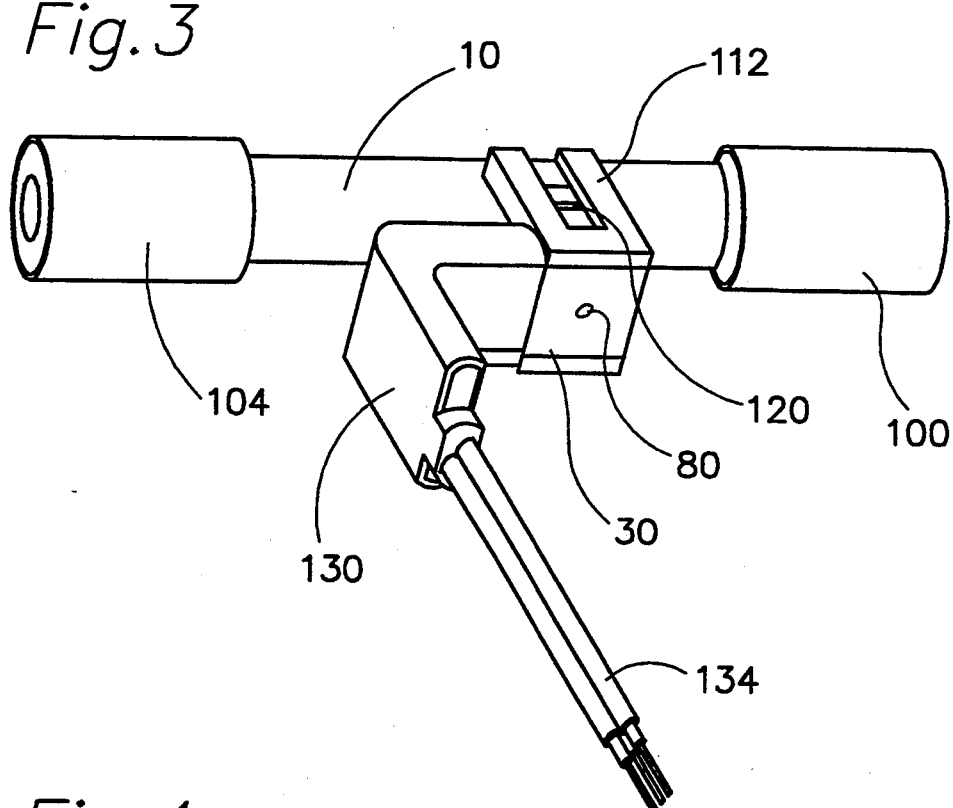
FIG. 3 is a perspective assembled illustration of the present invention.

FIG. 3 shows the assembled elements of FIG. 2. The housing 30 is held in intimate contact against the first conduit 10 by the cooperative action of the extensions, 110 and 112, and the protrusions 120. FIG. 3 also shows the small opening where the third conduit 80 connects with the space in the opening of the first compressible seal 50 with the surrounding environment. The connector 130 is attached to the extension 140 and its lip so that the leads 40 are disposed within the connector 130.

Figure 4:
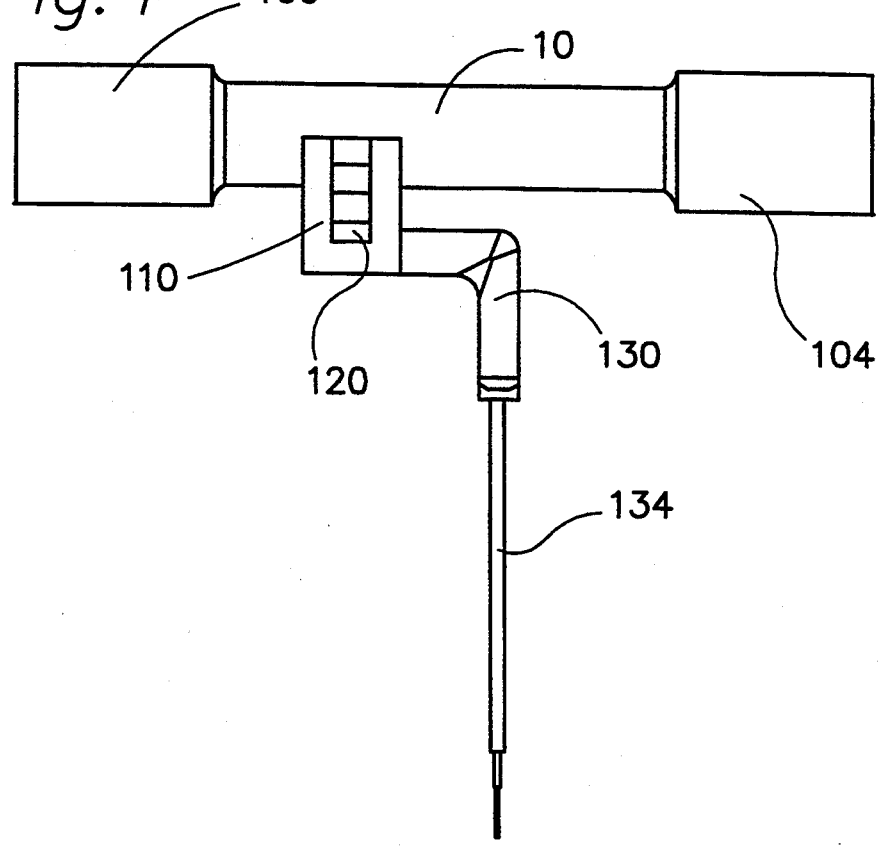
FIG. 4 is a side view of the assembled present invention.

FIG. 4 is a side view of the assembled flowthrough pressure sensor described above and illustrated in the perspective view of FIG. 3. The housing is retained in position by the cooperative association of the extension members 110 and 112 with the protrusions 120. This attachment maintains a compressive force against the first and second compressible seals and the pressure sensitive element as described above.

Although the present invention has been described in considerable detail and illustrated with particular specificity, it should be understood that alternative embodiments of the present invention are also within its scope.

The embodiments of the invention in which an exclusive property or right is claimed are defined as follows:

1. A pressure sensor, comprising:
a first conduit having a first central axis;
a boss portion formed on said first conduit, said boss portion having a first surface formed thereon;
a second conduit formed through said boss portion and said first surface, said second conduit being disposed in fluid communication with said first conduit;
a housing having an opening formed therein, said opening having a second surface therein;
a plurality of electrically conductive leads extending through a portion of said housing, portions of said leads being exposed within said opening formed in said housing;
a pressure sensing element disposed within said opening;
a first compressible seal disposed between said second surface and said pressure sensing element, said first compressible seal having a central opening extending therethrough, said first compressible seal being selectively conductive through its thickness to dispose said portions of said leads in electrical communication with conductive portions of said pressure sensing element;
a second compressible seal disposed in contact with said pressure sensing element, said second compressible seal having a central opening extending therethrough, said pressure sensing element being disposed between said first and second compressible seals, said second compressible seal being disposed between said pressure sensitive element and said first surface;
a clamp for forcing said housing in a direction toward said boss portion and compressing said first compressible seal, said second compressible seal and said pressure sensing element being compressed between said first and second surfaces, said first conduit being disposed in fluid communication with said pressure sensing element through said second conduit, said opening of said second compressible seal, the combined length of the fluid path extending from said first conduit to said pressure sensing element being less that twice the magnitude of the diameter of said second conduit; and
an electrically insulative coating disposed on a surface of said pressure sensitive element, said coating being disposed between said pressure sensitive element and said second compressible seal.

2. The sensor of claim 1, further comprising:
a third opening extending through said housing from said central opening of said first compressible seal to a region external to said housing.

3. The sensor of claim 1, wherein:
said pressure sensing element comprises a deformable diaphragm having a plurality of piezoresistive elements disposed thereon.

4. The sensor of claim 1, wherein:
said clamp comprises a pair of latches, each of said pair of latches comprising a protrusion on said housing and an associated extension member attached to said first conduit, said extension member having an opening shaped to receive said protrusion therein.

5. The sensor of claim 1, wherein:
said first compressible seal is made of an elastomeric material.

6. The sensor of claim 1, wherein:
said second compressible seal is made of an elastomeric material.

7. The sensor of claim 1, wherein:
said first conduit comprises first and second ends, said first and second ends being formed into a cylindrical shape, said cylindrical shape having a diameter that is larger than the outside diameter of said first conduit.

8. The sensor of claim 1, wherein:
said first conduit is generally cylindrical.

9. The sensor of claim 1, further comprising:

an outer cover structure disposed around said housing and said boss portion, said first conduit extending from said outer cover structure.

10. The sensor of claim 1, wherein:

said insulative coating comprises parylene "C".

11. A pressure sensor, comprising:

a first conduit having a first central axis;

a boss portion formed on said first conduit, said boss portion having a first surface formed thereon;

a second conduit formed through said boss portion and said first surface, said second conduit being disposed in fluid communication with said first conduit;

a housing having an opening formed therein, said opening having a second surface therein;

a plurality of electrically conductive leads extending through a portion of said housing, portions of said leads being exposed within said opening formed in said housing;

a pressure sensing element disposed within said opening;

a first compressible seal disposed between said second surface and said pressure sensing element, said first compressible seal having a central opening extending therethrough, said first compressible seal being selectively conductive through its thickness to dispose said portions of said leads in electrical communication with conductive portions of said pressure sensing element;

a second compressible seal disposed in contact with said pressure sensing element, said second compressible seal having a central opening extending therethrough, said pressure sensing element being disposed between said first and second compressible seals, said second compressible seal being disposed between said pressure sensitive element and said first surface;

a clamp for forcing said housing in a direction toward said boss portion and compressing said first compressible seal, said second compressible seal and said pressure sensing element being compressed between said first and second surfaces, said first conduit being disposed in fluid communication with said pressure sensing element through said second conduit, said opening of said second compressible seal; and a third opening extending through said housing from said central opening of said first compressible seal to a region external to said housing, the combined length of the fluid path extending from said first conduit to said pressure sensing element being less that twice the magnitude of the diameter of said second conduit, said first conduit comprising first and second ends, said first and seconds being formed into a cylindrical shape, said cylindrical shape having a diameter that is larger than the outside diameter of said first conduit and said first conduit is generally cylindrical.

12. The sensor of claim 11, wherein:

the combined length of the fluid path extending from said first conduit to said pressure sensing element is less that twice the magnitude of the diameter of said second conduit.

13. The sensor of claim 11, wherein:

said pressure sensing element comprises a deformable diaphragm having a plurality of piezoresistive elements disposed thereon.

14. The sensor of claim 13, wherein:

said clamp comprises a pair of latches, each of said pair of latches comprising a protrusion on said housing and an associated extension member attached to said first conduit, said extension member having an opening shaped to receive said protrusion therein.

15. The sensor of claim 14, wherein:

said first compressible seal is made of an elastomeric material; and said second compressible seal is made of an elastomeric material.

16. The sensor of claim 15, further comprising:

an outer cover structure disposed around said housing and said boss portion, said first conduit extending from said outer cover structure; and an insulative coating disposed on a surface of said pressure sensitive element, said coating being disposed between said pressure sensitive element and said second compressible seal.

17. A pressure sensor, comprising:

a first conduit having a first central axis;

a boss portion formed on said first conduit, said boss portion having a first surface formed thereon;

a second conduit formed through said boss portion and said first surface, said second conduit being disposed in fluid communication with said first conduit;

a housing having an opening formed therein, said opening having a second surface therein;

a plurality of electrically conductive leads extending through a portion of said housing, portions of said leads being exposed within said opening formed in said housing;

a pressure sensing element disposed within said opening;

a first compressible seal disposed between said second surface and said pressure sensing element, said first compressible seal having a central opening extending therethrough, said first compressible seal being selectively conductive through its thickness to dispose said portions of said leads in electrical communication with conductive portions of said pressure sensing element;

a second compressible seal disposed in contact with said pressure sensing element, said second compressible seal having a central opening extending therethrough, said pressure sensing element being disposed between said first and second compressible seals, said second compressible seal being disposed between said pressure sensitive element and said first surface;

a clamp for forcing said housing in a direction toward said boss portion and compressing said first compressible seal, said second compressible seal and said pressure sensing element being compressed between said first and second surfaces, said first conduit being disposed in fluid communication with said pressure sensing element through said second conduit, said opening of said second compressible seal;

a third opening extending through said housing from said central opening of said first compressible seal to a region external to said housing, the combined length of the fluid path extending from said first conduit to said pressure sensing element being less that twice the magnitude of the diameter of said second conduit, said pressure sensing element comprising a deformable diaphragm having a plurality of piezoresistive elements disposed thereon, said clamp comprising a pair of latches, each of said pair of latches comprising a protrusion on said housing and an associated extension member attached to said first conduit, said extension member having an opening shaped to receive said protrusion therein, said first compressible seal being made of an elastomeric material, said second compressible seal being made of an elastomeric material, said first conduit comprises first and second ends, said first and second ends being formed into a cylindrical shape, said cylindrical shape having a diameter that is larger than the outside diameter of said first conduit and said first conduit is generally cylindrical;

an outer cover structure disposed around said housing and said boss portion, said first conduit extending from said outer cover structure; and an insulative coating disposed on a surface of said pressure sensitive element, said coating being disposed between said pressure sensitive element and said second compressible seal.

* * * * *